(12) United States Patent
Kumar

(10) Patent No.: US 10,141,630 B2
(45) Date of Patent: Nov. 27, 2018

(54) ANTENNA INCORPORATED INTO DEVICE HINGE AND METHOD

(71) Applicant: Intel Corporation, Santa Clara, CA (US)

(72) Inventor: Praveen Kumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/477,054

(22) Filed: Apr. 1, 2017

(65) Prior Publication Data

US 2018/0287241 A1 Oct. 4, 2018

(51) Int. Cl.
*H01Q 1/22* (2006.01)
*G06F 1/16* (2006.01)
*H01Q 1/50* (2006.01)

(52) U.S. Cl.
CPC ......... *H01Q 1/2266* (2013.01); *G06F 1/1681* (2013.01); *H01Q 1/50* (2013.01)

(58) Field of Classification Search
None
See application file for complete search history.

(56) References Cited

U.S. PATENT DOCUMENTS

| | | | | |
|---|---|---|---|---|
| 6,348,897 B1* | 2/2002 | Alameh | ............... | H01Q 1/084 343/702 |
| 2001/0040529 A1* | 11/2001 | Cheng | ............... | G06F 1/1616 343/702 |
| 2006/0071863 A1* | 4/2006 | Lindell | ............... | H01Q 1/242 343/702 |
| 2009/0033562 A1* | 2/2009 | Takeuchi | ............... | H01Q 1/243 343/702 |
| 2010/0052999 A1* | 3/2010 | Minemura | ............... | H01Q 1/243 343/702 |
| 2012/0026062 A1* | 2/2012 | Krupa | ............... | H01Q 1/084 343/860 |
| 2013/0077224 A1* | 3/2013 | Mo | ............... | G06F 1/1616 361/679.21 |
| 2017/0310002 A1* | 10/2017 | Files | ............... | H01Q 3/24 |

OTHER PUBLICATIONS

Search Report dated May 30, 2018 for International Patent Application PCT/US2018/014684.

* cited by examiner

*Primary Examiner* — Howard Williams
(74) *Attorney, Agent, or Firm* — Schiff Hardin LLP

(57) ABSTRACT

A method and apparatus for switching between two antenna elements in an electronic device having a hinge. A rotating element within the hinge has a coupling or contact brush that extends into contact with a first contact element connected to a first antenna element. Rotation of the hinge moves the coupling of coupled communication with the first contact element and into coupled communication with a second contact element, that connects to a second antenna element. The first and second antenna elements are provided on a hinge of an electronic device that may be moved from a closed position to a 360 degree open position or tablet position. The movement of the hinge switches between the two antenna elements to avoid blocking of the connected antenna(s) by the body of the electronic device.

17 Claims, 10 Drawing Sheets

ANTENNA INCORPORATED INTO DEVICE HINGE AND METHOD

TECHNICAL FIELD

The present disclosure relates generally to an antenna for a device and method, and more particularly to an antenna that is incorporated into a device having a hinge and method.

BACKGROUND

Many computing device and mobile electronic devices have metal housings which block or limit radio frequency communications, such as wireless communications, if the radio frequency antenna is enclosed within the metal housing. Computing devices (including mobile phones, laptop computers, tablet computers, portable displays, and other electronic devices) that have a full metal body are in demand and are considered to be premium devices. Finding space on the full metal body to locate an antenna so that the antenna signal is not attenuated by the metal body or housing has proven difficult. Antenna designers are starting to use the hinge area to place antennas on metal body laptop computers. A problem with locating an antenna at a hinge is that the performance of the antenna varies with different positions of the metal body about the hinge. The performance of the antenna may change dramatically depending on the hinge angle. This is especially true for devices where the hinge is constructed to permit portions of the body to be rotated over large angles, and particularly where the body may be rotated a full 360 degrees or nearly so.

DETAILED DESCRIPTION

Figure 1:
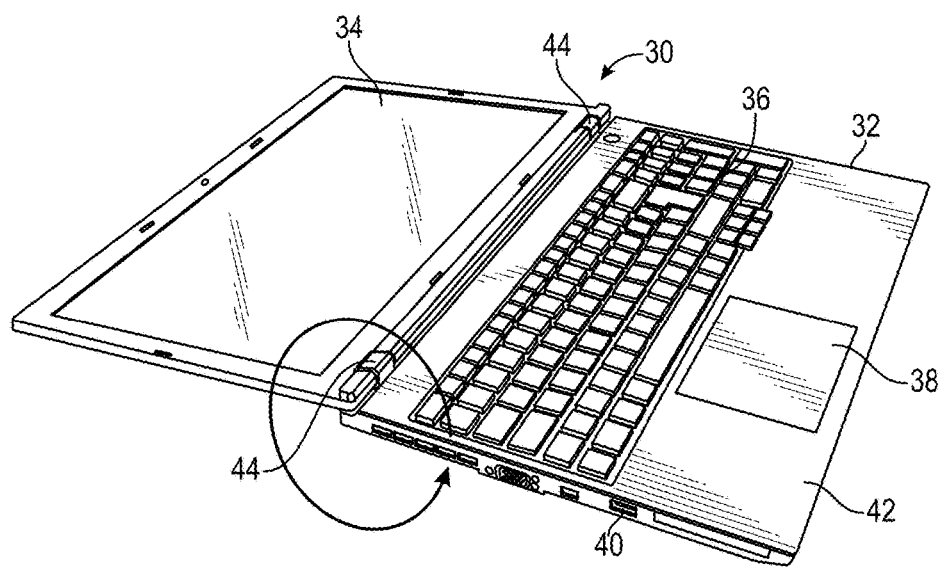
FIG. 1 is a perspective view from the top, left-hand side of a laptop computer having a hinge that permits opening of the display and keyboard portions of the computer to positions of 180 degrees and beyond.

Referring first to FIG. 1, a laptop computer 30 includes a computer portion 32 and a display portion 34. The computer portion 32 includes a keyboard 36, touch pad 38, and may include connectors 40 for connecting the laptop computer 30 to a power cord, to serial or parallel bus devices such as USB devices, to headphones, speakers, microphones, network cables, or other devices as well as slots for receiving memory cards, disks including DVD disks, peripheral device connectors, or the like. The computer 30 may have a housing or case 42 that encloses interior components including a processor, memory, solid state or hard drive storage, power supply, communications devices such as wireless communications device, and the like. The illustrated computer housing or case 42 is formed of metal. The metal case 42 provides durability and a desirable appearance but has the effect of blocking or attenuating radio frequency signals by which the computer communicates wirelessly with other devices using for example, Wi-Fi, Bluetooth, Near Field Communication, mobile telephone technology, or other wireless communications. This is particularly so if the antenna for the wireless communication is located within the housing or at a position where the housing blocks the antenna.

The computer portion 32 and display portion 34 are connected to one another by a pair of hinges 44. The hinges 44 permit the display portion 34 to be folded to a closed position over the keyboard 36 of the computer portion 32 or to be moved to an open position providing access to the keyboard 36 for use of the computer 30 by a user. In the illustrated embodiment, the hinges 44 are constructed to permit the display portion 34 to be opened to a position generally parallel to and adjacent to the computer portion 32, which may be referred to as a 180 degree mode of operation. The hinges 44 may be configured for pivoting beyond the 180 degree position and may even permit pivoting of the computer portion 32 and display portion by 360 degrees to a position with the computer portion 32 beneath the display portion 34. Some computer manufacturers refer to this as a tablet computer mode. As may be seen in FIG. 1, the hinges 44 may have dual pivot axes to permit rotation of greater than 180 degrees.

In laptop computers 30 such as shown as well as in other electronic devices, such as mobile telephones, displays, tablet computers, etc., that have hinges 44 an antenna may be located at the hinge 44. However, the antenna located at the hinge 44 may be blocked by the case when the device is in a lid closed mode, or when the device is on other modes such as a 360 degree mode. An improvement over an antenna in a single hinge of the device is to provide two antennas, one located on each of the two hinges 44 and configure the antennas in such a manner that one antenna is functional at all times. This may be an improvement over losing coverage in, for example, a lid closed mode.

A further improvement may be provided by providing two antennas on a hinge of the device and by providing a switch to change between the two antennas as the hinge is operated. Yet a further improvement may be achieved by providing two antenna elements on each of the two hinges of the device along with an antenna switch on each of the two hinges to change between the antenna elements.

In certain aspects, a mechanism is located inside the hinge of the device and two antenna elements are located over the hinge. The antennas are placed so that one of the antennas has good performance when the device is in the 0 degree to 180 degree position and so that the other antenna is positioned for good performance when the device is in a greater than 180 degree position, for example, a 180 degree to 360 degree position. It is not necessary for the hinge to provide full 360 opening. The principles of the present improvement may be provided for switching between two or more antennas depending on hinge position, regardless of the range of motion of the hinge or the extent over which the connection is made to one or the other antenna. For example, one antenna may be connected for operation at hinge positions of 0 to 90 degrees and a second antenna may be connected for operation at positions of 90 degrees and greater. Of course, other angles are also possible. It is also contemplated that a plurality of antennas may be provided and that each is connected for operation at a respective plurality of hinge positions.

Figure 2:
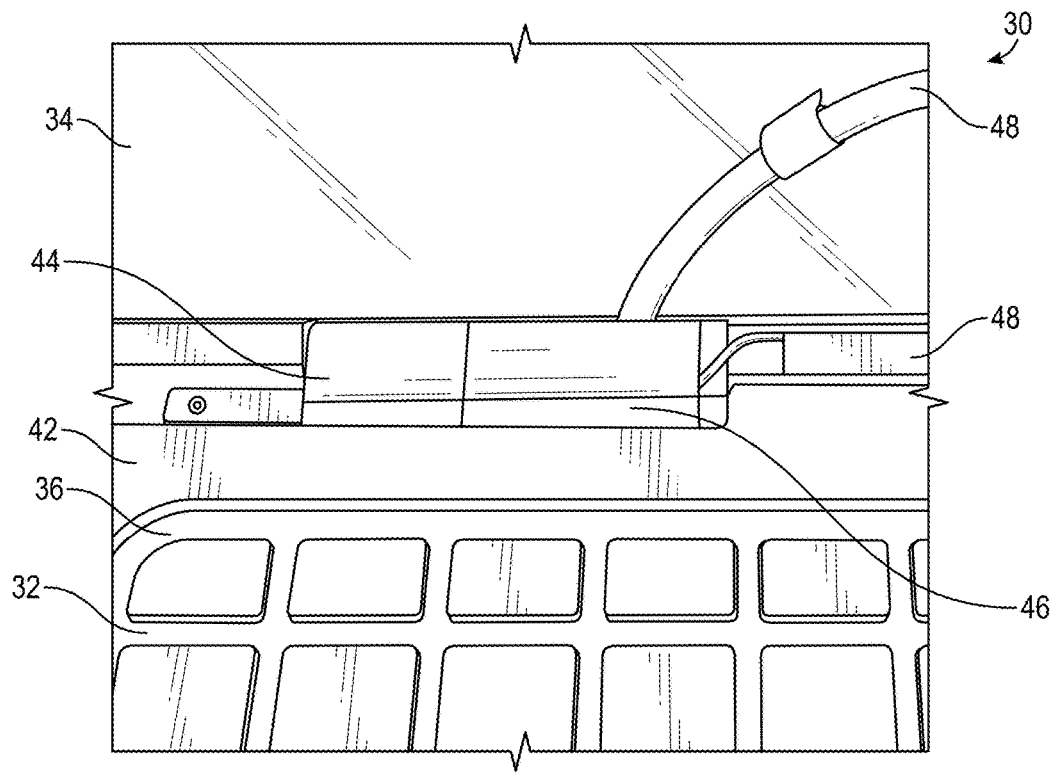
FIG. 2 is an enlarged view of a portion of keyboard and hinge of a laptop computer having an antenna assembly at the hinge.

In FIG. 2, an enlarged view of a portion of a keyboard 36 of a laptop computer 30 shows a hinge 44 that connects the computer portion 32 to the display portion 34. An antenna element 46, which is a first antenna element, has been provided on the hinge 44. The antenna 46 is positioned on an outer portion of the hinge 44 and may be wrapped at least partially around one or both hinge axes. The antenna element 46 may be disposed on an outside surface of the hinge 44 or may be disposed beneath a cover, coating or within an interior of the hinge 44. The antenna element 46 is positioned so that the antenna element 46 may send and receive radio frequency communications when the computer portion 32 and display portion 34 are in a predetermined range of angular positions, for example, where the computer portion 32 and display portion 34 do not block the antenna element for wireless communication. The illustration shows that a main radiating portion of the antenna element 46 exposed at the keyboard side when the display portion 34 is open in a clamshell position with the display facing the user as the user is operating the keyboard 36. This position typically involves the computer portion 32 and the display portion being at positions of about 90 to 180 degrees from one another to permit the user to see the display and also have access to the keys of the keyboard 36, although it is possible to operate the laptop computer with the display open less than 90 degrees. A second antenna element may be positioned on an opposite side of the hinge, as will be shown. The antenna elements may be any antenna structure including monopole, IFA (inverted F antenna), or loop antenna configurations.

The antenna element 46 shown in FIG. 2 is a prototype antenna that is connected for operation using exposed wiring 48. It is envisioned that the antenna element 46 will be provided with covered wiring or contacts in a commercial construction. The antenna element 46 may be covered in a commercial construction.

Figure 3:
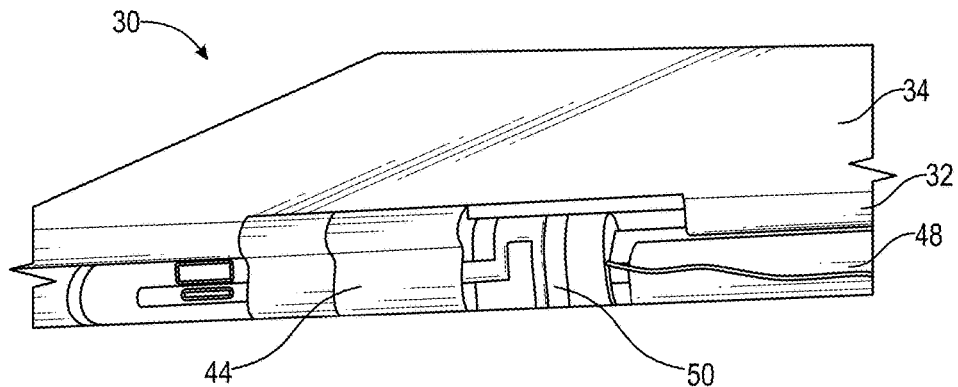
FIG. 3 is a back perspective view of a portion of a laptop computer in a closed position with an antenna assembly at the hinge of the computer.

FIG. 3 shows the laptop computer 30 with the display portion 34 closed onto the computer portion 32 in a closed position. A second antenna element 50 is mounted at or on the hinge 44. The second antenna element 50 is mounted in a position on an opposite side of the hinge from the first antenna element 46 so that the second antenna element 50 is exposed for transmission and reception when the laptop computer 30 is closed. The first antenna element 46 shown in FIG. 2 may be on an opposite side of the hinge 44 from the second antenna element 50. In the closed position, the first antenna element 46 may be blocked by the computer portion 32 and display portion 34, but the second antenna element 50 is unblocked. If the laptop computer 30 were to be moved to the 360 degree open position, the second antenna element 50 would be blocked by the computer portion 32 and the display portion 34, and the first antenna element 46 would be unblocked for transmission and reception. Exposed wiring 48 is visible in the illustration of the prototype, which would be reconfigured as covered conductors in a commercial version.

The graphs shown herein are of two types, efficiency graphs and return loss graphs. The efficiency graphs show the ratio of radiated power to power input to the antenna. A value of 0.1 on the graph corresponds to 10 percent of input power being radiated, whereas a value of 0.5 indicates that 50 percent of the input power is radiated. The higher the value, the better.

The return loss graphs show how much power returns due to an impedance mismatch. The return loss is plotted in dB. Lower values are better. A −10 dB return loss is better than −3 dB. Normally, −6 dB or lower values are accepted but sometimes a −4 dB return loss can be accepted.

Figure 4:
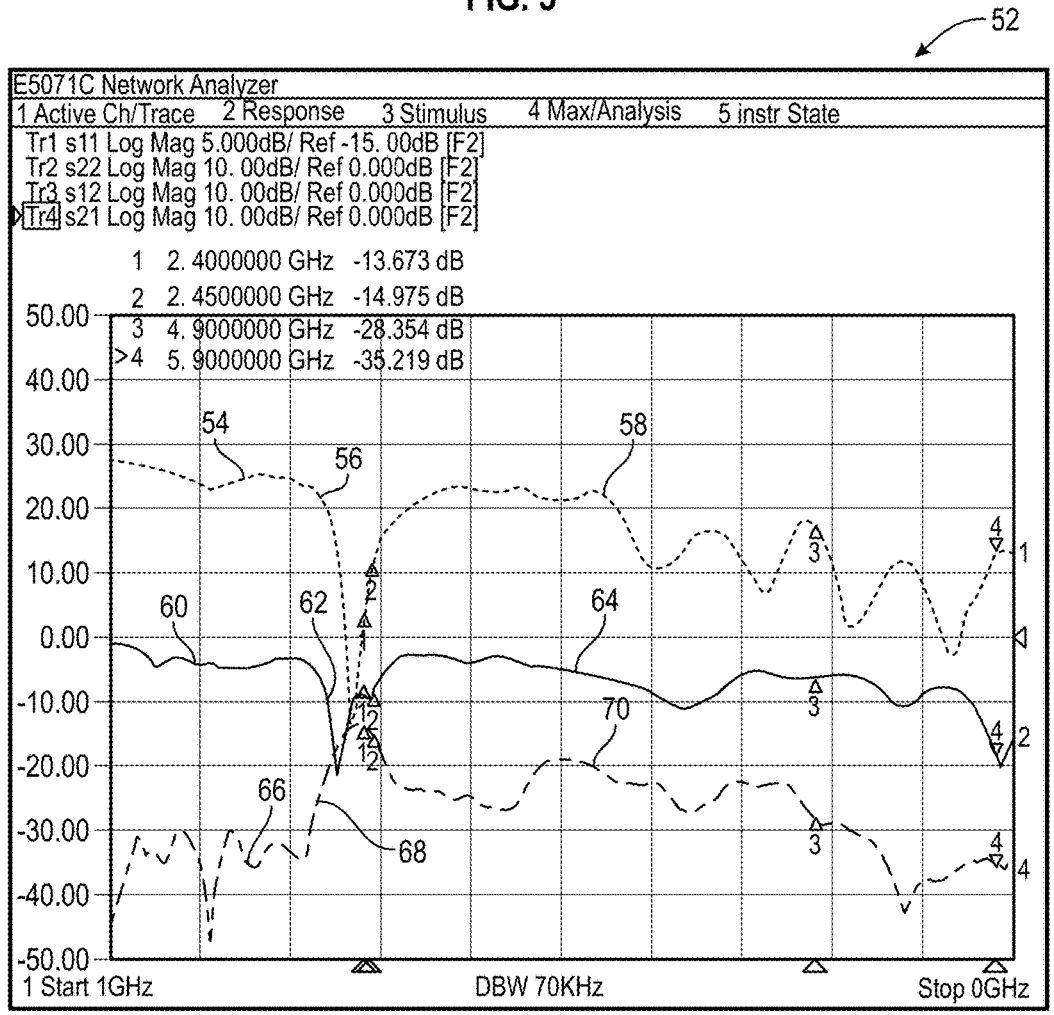
FIG. 4 is a graph showing return loss for the antenna assembly of FIGS. 2 and 3.

FIG. 4 shows a graph 52 of return loss and isolation for both antennas 46 and 50 with a vertical axis showing return loss and isolation in dB and a horizontal axis indicating frequency. Trace 54 and 60 shows the return loss of the antennas 46 and 50, respectively. The measured values shows that the antennas are matched well. Trace 66 shows the isolation and the measured isolation between the antennas 46 and 50 is about 13 dB, in the illustrated example.

Figure 5:
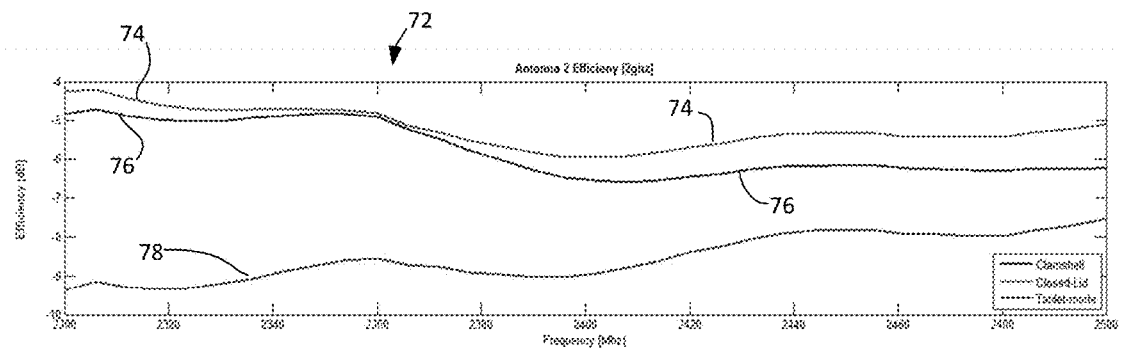
FIG. 5 is a graph showing efficiency of a first antenna of the assembly at different test modes.

Turning to FIG. 5, a graph 72 shows efficiency of the second antenna element 50 at three positions of the hinge 44 on the laptop computer 30. The graph 72 shows efficiency in dB on the vertical axis and in frequency along the horizontal axis. A first trace 74 shows the antenna efficiency with the lid closed, in other words with the display portion 34 closed onto the computer portion 32. A second trace 76 shows the efficiency of the second antenna element 50 with the laptop computer 30 in a clamshell position, in other words with the display portion 34 open by 90 degrees or more from the computer portion 32. The second trace 76 is a little below the first trace 74 but may provide acceptable performance for the second antenna 50. A third trace 78 shows the antenna efficiency with the laptop computer 30 in the tablet mode or 360 degree mode, in which the computer portion 32 is folded under the display portion 34. The computer and display portions 32 and 34 cover and/or block the second antenna portion 50 in the 360 degree mode as indicated by the lower efficiency of the third trace 78.

Figure 6:
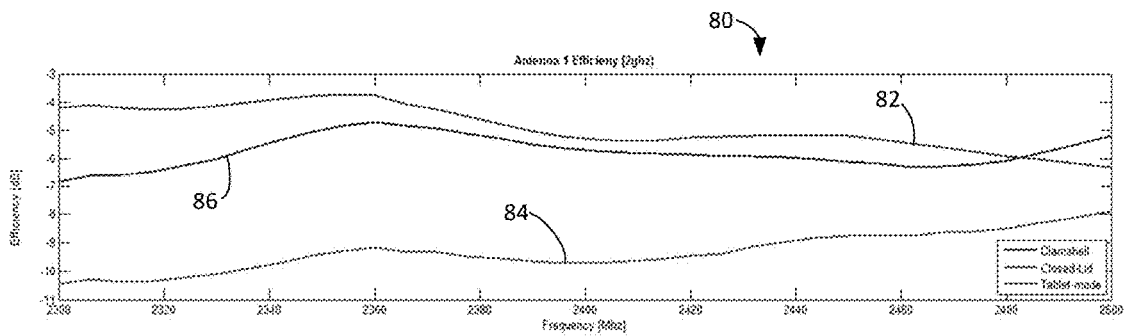
FIG. 6 is a graph showing efficiency of a second antenna of the antenna assembly at different test modes.

By comparison, FIG. 6 is a graph 80 of the efficiency of the first antenna element 46 at three positions of the hinge 44 and laptop computer 30. The first trace 82 shows the efficiency of the first antenna element 46 in the closed lid position, at a low efficiency compared to the higher efficiency at trace 74 for the second antenna 50. The first antenna element 46 efficiency at the tablet mode, or position with the computer portion 32 folded under the display portion 34 is shown at trace 84, a much higher efficiency than for the trace 78 of the second antenna 50. A trace 86 shows the clamshell mode efficiency for the first antenna 46. By comparing FIGS. 5 and 6, it can be seen that the greatest change in efficiency as between the two antenna elements occurs when the laptop computer 30 is changed from the closed mode to the tablet mode. From the FIGS. 4, 5 and 6 it is concluded that a single antenna does not perform well in both closed and tablet positions or modes.

Figure 7:
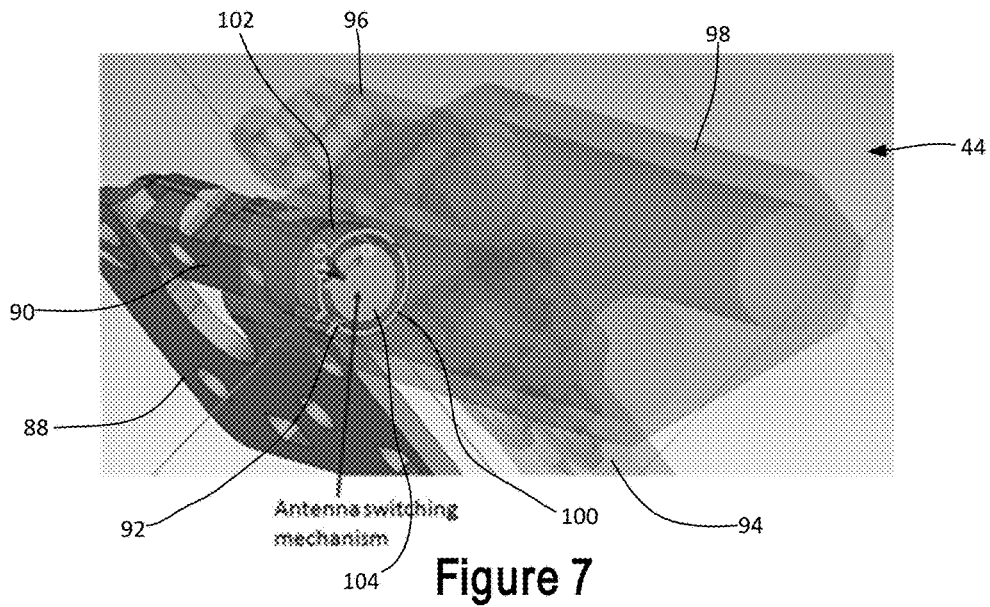
FIG. 7 is a perspective view showing portions a hinge and an antenna assembly.

FIG. 7 shows a portion of a two axis hinge 44 for use on a laptop computer 30 or similar device. The hinge 44 includes a first hinge plate 88 for connecting to the computer portion 32. The first hinge plate 88 includes a first hinge axle 90. An antenna switch 92 is provided on the first hinge axle 90. A second hinge plate 94 is provided for mounting to the display portion 34. The second hinge plate 94 includes a second hinge axle 96. A hinge body 98 is pivotally mounted onto the first and second hinge axles 90 and 96. The hinge axles 90 and 96 rotate within the hinge body 98 as the laptop computer 30 is moved between the closed position, clamshell position, 180 degree position and 360 degree position, and possibly other positions. The first and second antenna elements 46 and 50 may be mounted on the same hinge body 98 to expose one, the other or both of the antenna elements 46 and 50 for higher efficiency use.

The antenna switch 92 switches between the two antennas 46 and 50 depending on the position of the hinge 44. A first contact element 100 is provided extending about a first portion of the first hinge axle 90 and a second contact element 102 extends about a second portion of the first hinge axle 90. The first and second contact elements 100 and 102 are stationary relative to the hinge body 98 and rotate relative to the first hinge axle 90. Said another way, the first hinge axle 90 rotates with the first and second contact elements 100 and 102. The first and second contact elements 100 and 102 are insulated from electrical contact with one another, such as by gaps between the contact elements 100 and 102. In certain aspects, the contact elements each extend for approximately one half of the circumference of the first hinge axle 90. The contact elements may extend about more or less of the axle as desired. A rotating element 104 is mounted to the hinge axle 90 and disposed to rotate within the contact elements 100 and 102 during movement of the hinge 44. The rotating element 104 electrically connects to either of the contact elements 100 and 102, depending on the position of the hinge 44. The hinge switch and antenna elements may be provided on one, two or more hinges of an electronic device.

Figure 8:
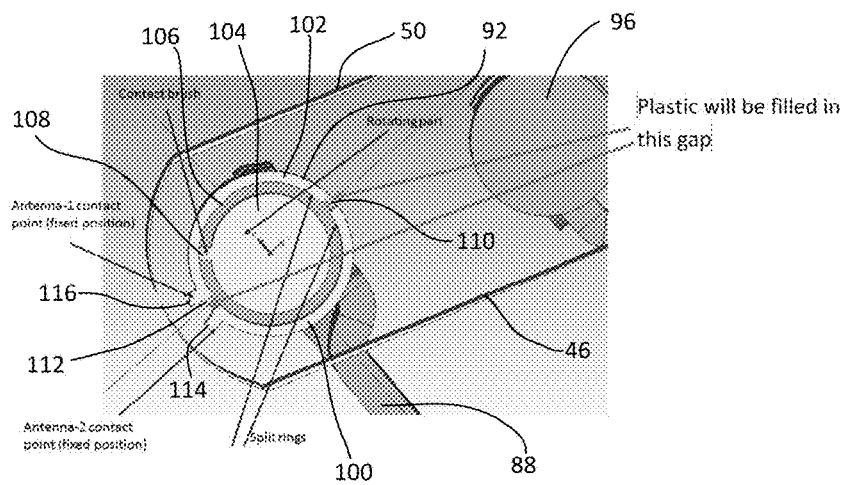
FIG. 8 is a cross-sectional view through the hinge and the antenna assembly of FIG. 7.

With reference to FIG. 8, the first hinge plate 88 is provided with the rotating element 104 within the first and second contact elements 100 and 102 that are mounted in the hinge body 98. The rotating part 104 is insulated from the first and second contact elements by a sleeve 106, which may be of a cylindrical shape and positioned between the rotating part 104 and the contact elements 100 and 102. A contact brush or other coupling 108 extends from the rotating part 104 into contact with an inside surface of either the contact element 100 or the contact element 102, depending on the position of the hinge 44. The contact brush 108 may be in the shape of a fin, arm, spring or post or other projection extending from the rotating element 104. The contact brush 108 may be spring-loaded or may be flexible to maintain contact with the contact elements 100 and 102. The contact brush 108 may extend through an opening or slot in the sleeve 106.

The contact brush 108 as shown is but one example of a coupling that may be provided. The coupling may be any device or structure that provides electrical or electro-magnetic communication or coupling between the transceiver and the antenna elements. Any structure or method for feeding the antenna may be used.

The rotating part 104 is connected to one or more transmitting and/or receiving circuits, such as a Wi-Fi or Bluetooth transceiver, or other circuit, in the computer portion 32. An electrical connection to carry the radio frequency (RF) signals of the transmitting or receiving circuits is provided through the rotating part 104, through the contact brush 108, and to one or the other of the first and second contact elements 100 or 102. The contact element 100 is electrically connected to the first antenna element 46 and the contact element 102 is electrically connected to the second antenna element 50. When the antenna switch 92 is in the position shown, the contact brush 108 electrically connects the second antenna element 50 to the transmitting and receiving circuits by virtue of its connection to the contact element 102. By rotating the hinge 44 to a position with the contact brush 108 in contact with the first contact element 100, the transmit and receive circuits are connected to the first antenna element 46. The contact elements 100 and 102 provide contact points for connecting to the antenna elements.

Each of the contact elements 100 and 102 extend a little less than 180 degrees about the hinge axle. First and second gaps 110 and 112 are provided between the respective opposite ends of the contact elements 100 and 102. The contact elements 100 and 102 are provided with connection flanges 114 and 116 to which the respective antenna elements 46 and 50 are connected. In certain aspects, the gaps 110 and 112 are filled with a non-conductive material, such as plastic, for example to avoid the contact brush 108 getting stuck at the gaps 110 and 112. In certain aspects, the non-conductive material is shaped to conform to the cylindrical interior contact surface of the contact elements 100 and 102. For example, the non-conductive material includes an interior surface portion that together with the contact elements 100 and 102 form the cylindrical shape of the interior contact surface.

The contact brush 108 and contact elements 100 and 102 may be of any conductive material and may be of different shapes and constructions. In certain aspects, the contact brush 108 is spring-loaded maintain pressure by the contact brush 108 on the respective contact element 100 or 102, so at to thereby ensure contact with the contact elements 100 and 102.

Figure 9:
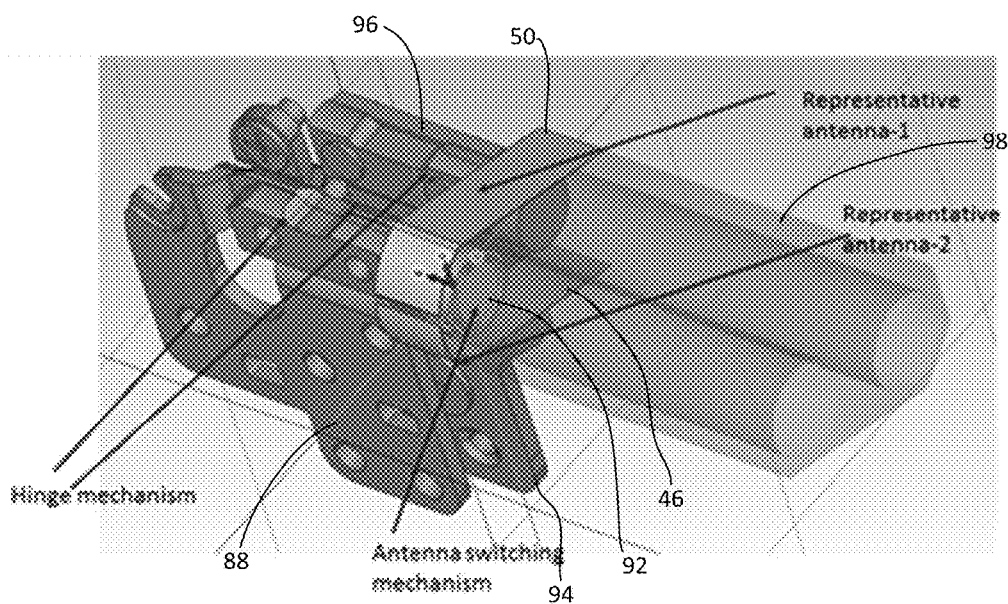
FIG. 9 is a perspective view of a hinge and an antenna assembly.

An example of the first and second antenna elements 46 and 50 is shown in FIG. 9. The antenna elements 46 and 50 are mounted at an end of the hinge body 98 and are shaped as generally parallel strips on opposite sides of the hinge body 98. The antenna switch 92 switches the connection from one to the other antenna element 46 and 50. The antenna elements may be larger, smaller, of a different shape, or located in any of a variety of locations, sizes, types, materials, and the like.

Figure 10:
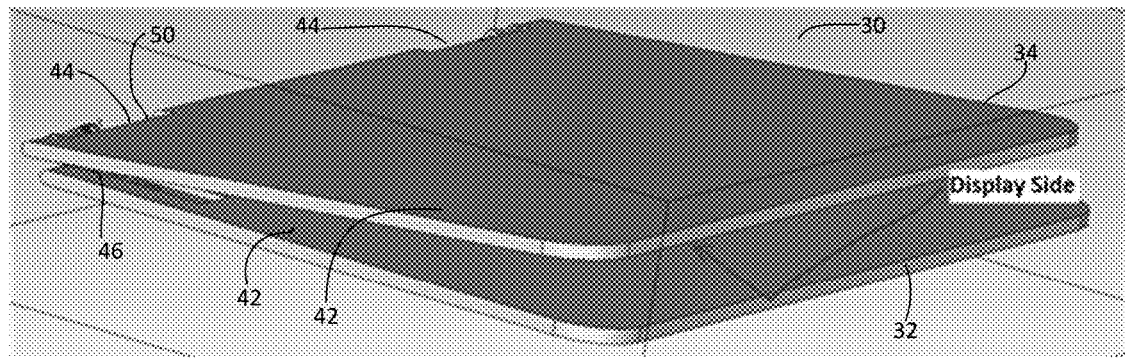
FIG. 10 is a perspective view of a laptop computer showing the display portion in a nearly closed position over the computer portion.

With reference now to FIG. 10, the laptop computer 30 is shown in a nearly closed position with the display portion 34 nearly on the computer portion 32 and a display panel of the display portion 34 directed toward the computer portion 32. A pair of hinges 44 are provided at the connecting edges. The position of the display portion and computer portion 32 will block or attenuate wireless signals to and from an antenna mounted at the hinges and facing toward the keyboard, for example, the first antenna element 46. The antenna element 50 is not blocked by the computer portions in this position and could be used for wireless communication. In the closed position, the antenna element 46 is disconnected and the antenna element 50 is connected.

Figure 11:
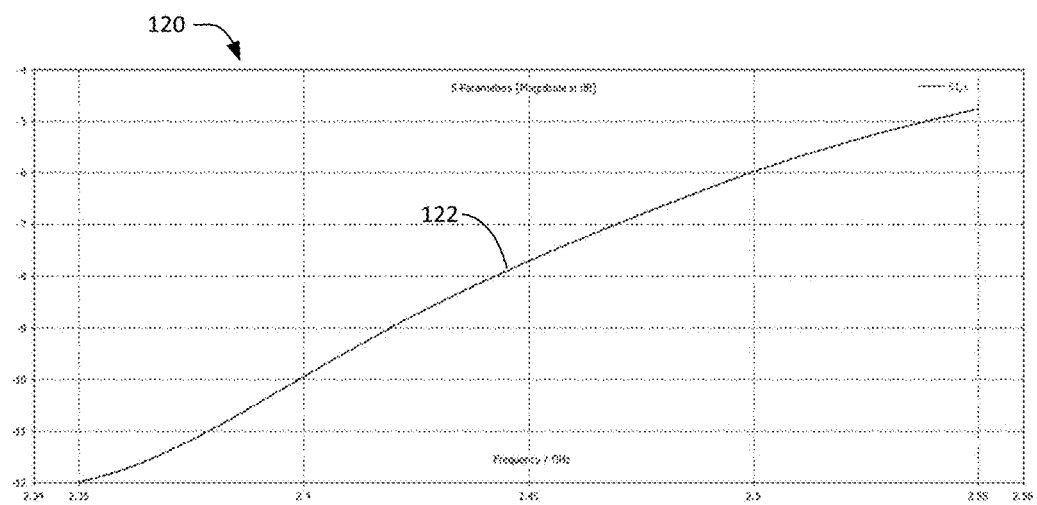
FIG. 11 is a graph showing a simulated return loss of an antenna on the laptop computer of FIG. 10 in a closed position.

FIG. 11 is a graph 120 showing a trace 122 of return loss for the antenna 50 in the closed lid mode as shown in FIG. 10. Loss in dB is shown along the vertical axis and frequency along the horizontal axis. The trace 122 shows lower values of return loss which is good.

Figure 12:
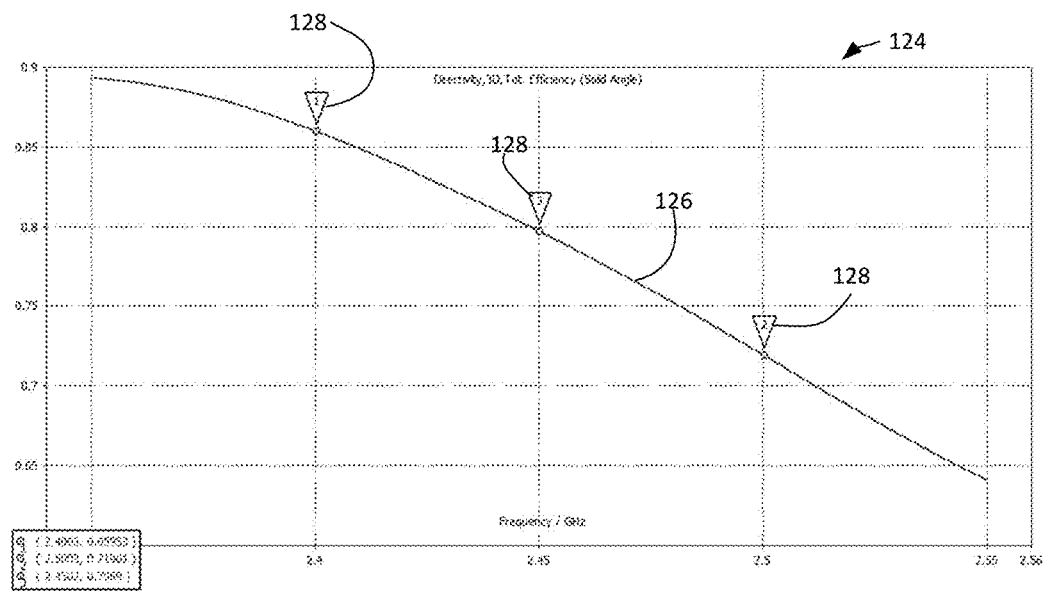
FIG. 12 is a graph showing a simulated efficiency of an antenna on the laptop computer of FIG. 10 in a closed position.

FIG. 12 is a graph 124 showing a trace 126 showing antenna efficiency in the closed lid mode for the antenna 50. Antenna efficiency is within an acceptable range and is more than 70 percent over the band as indicated by triangles 128. The triangles 128 in this graph and others shown herein indicate the Wi-Fi frequency band of 2.4 GHz to 2.5 GHz with the triangles marking the start, middle and end of the band.

Figure 13:
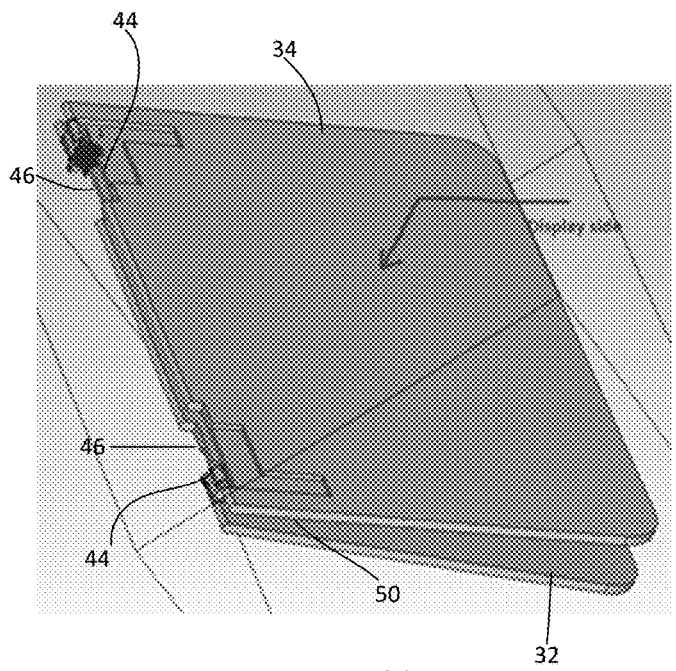
FIG. 13 is a perspective view of a laptop computer showing the display portion in a nearly fully open position or 360 degree mode beneath the computer portion.

FIG. 13 shows the laptop computer 30 folded into the tablet mode or 360 degree mode. The display portion 34 is positioned display side up on top of the computer portion 32. The dual axle hinges 44 permit the laptop computer 30 to be positioned in this mode. The first antenna element 46 is exposed in this position, and the second antenna element 50 is blocked by the computer portion 32 and the display portion 34. The antennas 46 and 50 are switched when moving between the position or mode of FIG. 10 and the position or mode of FIG. 13.

Figure 14:
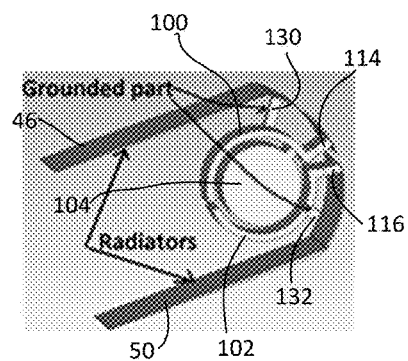
FIG. 14 is a detailed close-up view of an antenna structure and a switch mechanism as used for the simulation in FIG. 13.

FIG. 14 shows the first and second antenna elements 46 and 50 connected to the first and second contact elements 100 and 102 by the first and second connection flanges 114 and 116. Grounding connections 130 and 132 are provided between the contact elements 100 and 102 and the respective antenna elements 46 and 50.

Figure 15:
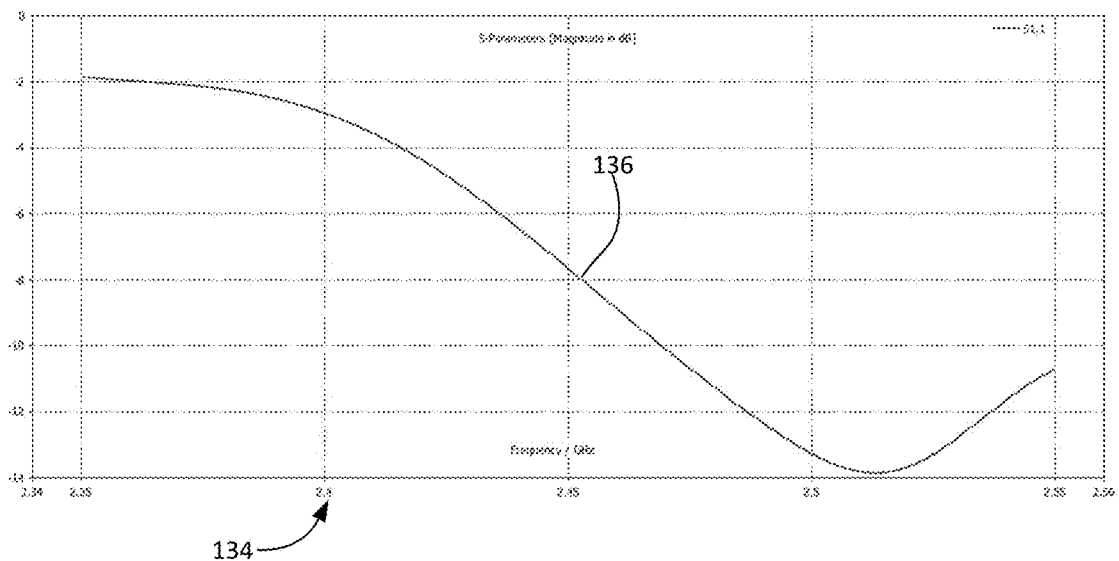
FIG. 15 is a graph of simulated return loss of an antenna in the 360 degree mode as shown in FIG. 13.

FIG. 15 shows a graph 134 of return loss in the 360 degree mode including a trace 136 showing the return loss for the antenna 46 in the tablet or 360 degree mode. The antenna 50 is disconnected in this position. The return loss for the antenna 46 is good in this position. Little shift in the frequency is seen, but that can be tuned.

Figure 16:
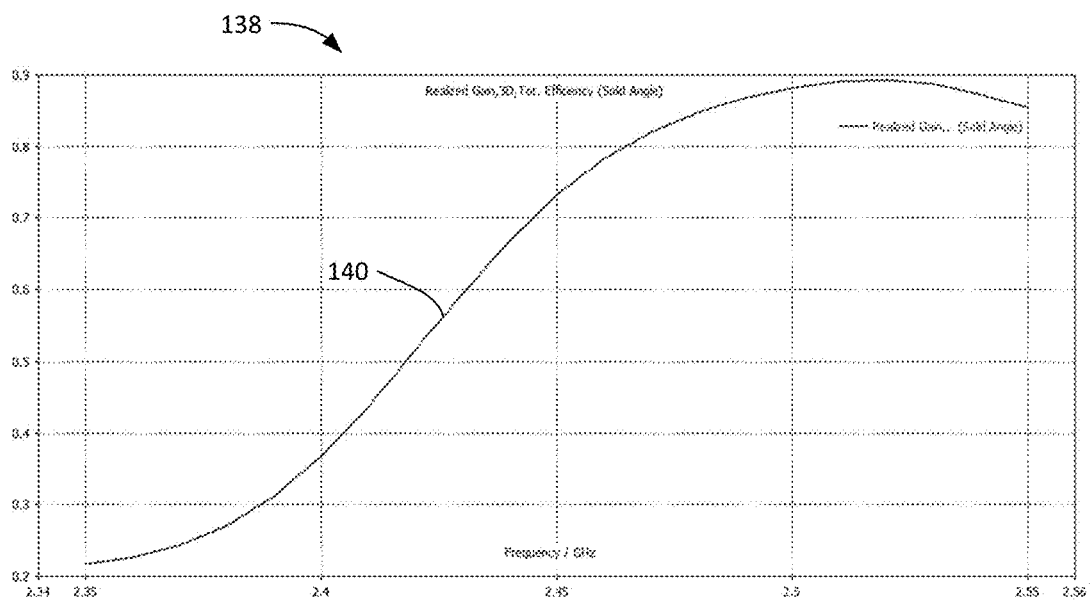
FIG. 16 is graph of simulated efficiency of an antenna in the 360 degree mode as shown in FIG. 13.

FIG. 16 is a graph 138 of antenna efficiency in the 360 degree mode including a trace 140 showing the efficiency for the antenna 46 in the tablet or 360 degree mode. The antenna efficiency is acceptable in this mode for the antenna 46. The efficiency over the band is greater than 40 percent and averages about 70 percent.

Figure 17:
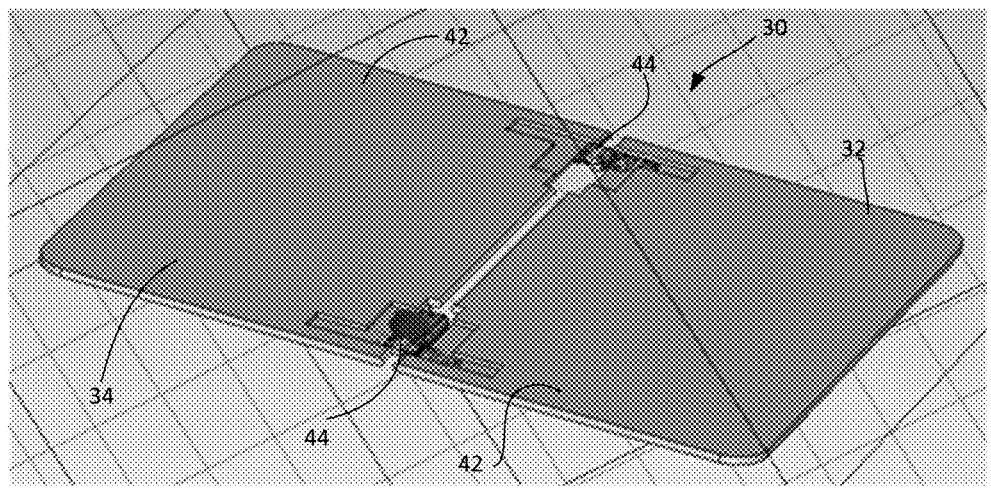
FIG. 17 is a perspective view from the top, left-hand side showing a laptop computer open in a 180 degree mode or position.

FIG. 17 shows the laptop computer 30 in a 180 degree mode with the computer portion 32 and the display portion alongside one another and either in the same plane or in parallel planes. The 180 degree position may not be practical for use. The antenna switch 92 changes between the antenna elements 46 and 50 when the hinge 44 is moved through this position in certain aspects. This may be referred to as an antenna change-over mode. It is of course possible that the antenna change-over may occur at other positions.

According to a first option, the antenna change-over mode may provide that no antenna is connected for certain positions between the two connected positions. At the change-over position, which may be at or near the 180 degree position, the two antenna elements 46 and 50 are both disconnected. This disconnected condition may exist over about 2 to 3 degrees of hinge motion in certain examples. More or less disconnected travel may be provided.

According to a second option, the antenna change-over mode results in both antennas elements 46 and 50 being connected. A wider contact brush 108 may connected to the next antenna element before disconnecting from the first antenna element. It is also possible that two contact brushes 108 may be provided, having two projections separated by a few degrees to make contact with one contact element before breaking contact with the other contact element.

Figure 18:
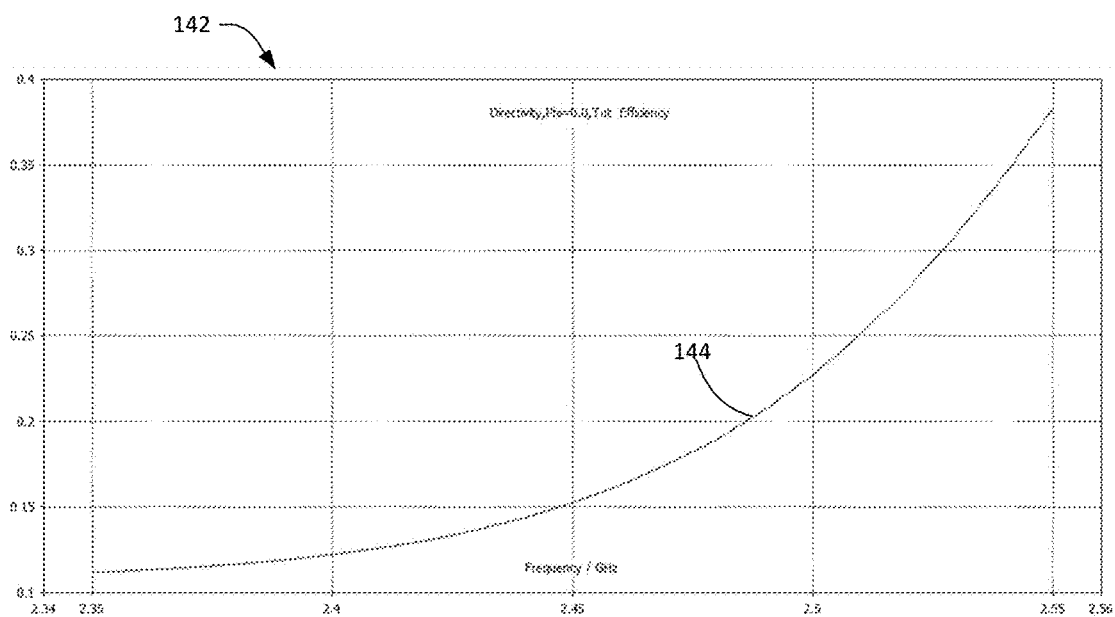
FIG. 18 is a graph of simulated efficiency of an antenna during antenna changeover with both antennas connected.

FIG. 18 is a graph 142 of antenna efficiency during antenna change over including a trace 144. The trace 144 shows efficiency where both antenna elements 46 and 50 are connected during the change-over time. The return loss was detuned due to mismatch in this mode. Efficiency is reduced to about 15 to about 20 percent when both antennas are connected during the change-over.

Good antenna efficiency can be achieved using the two antenna elements and the antenna switch at all positions except during the antenna change-over. The antenna change-over may be provided at the 180 degree position, which is not practical for use of the laptop in most cases.

Figure 19:
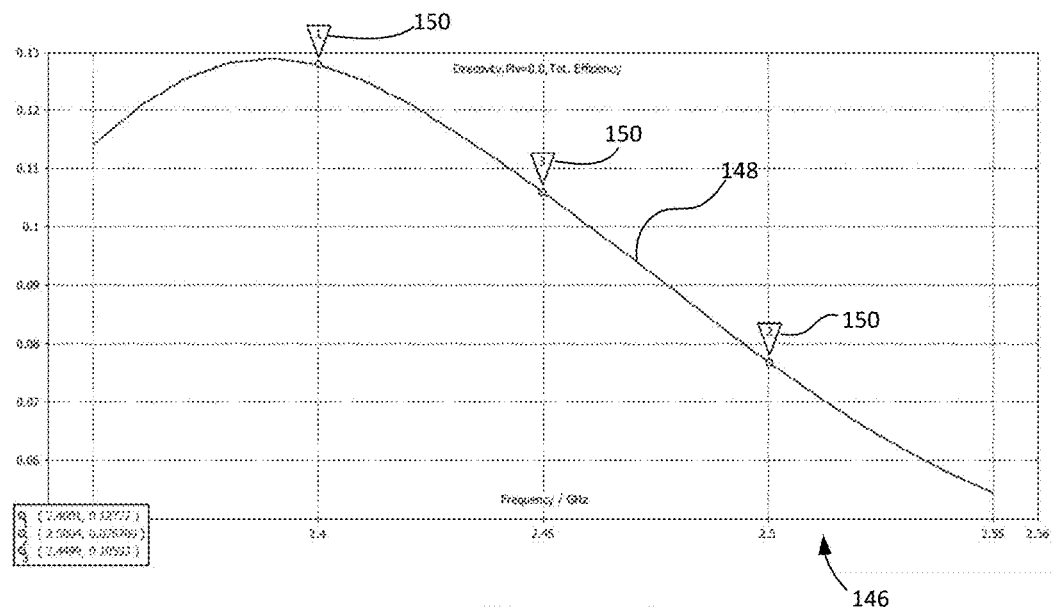
FIG. 19 is a graph of efficiency of an antenna in a device with a single antenna element in a closed lid mode.

FIG. 19 is a graph 146 of antenna efficiency including a trace 148 showing antenna efficiency for the antenna 46 in a closed lid mode when the technique of switching antennas is not used. Triangles 150 indicate signal frequencies of interest. The trace 148 drops off considerably in the frequencies of interest.

Figure 20:
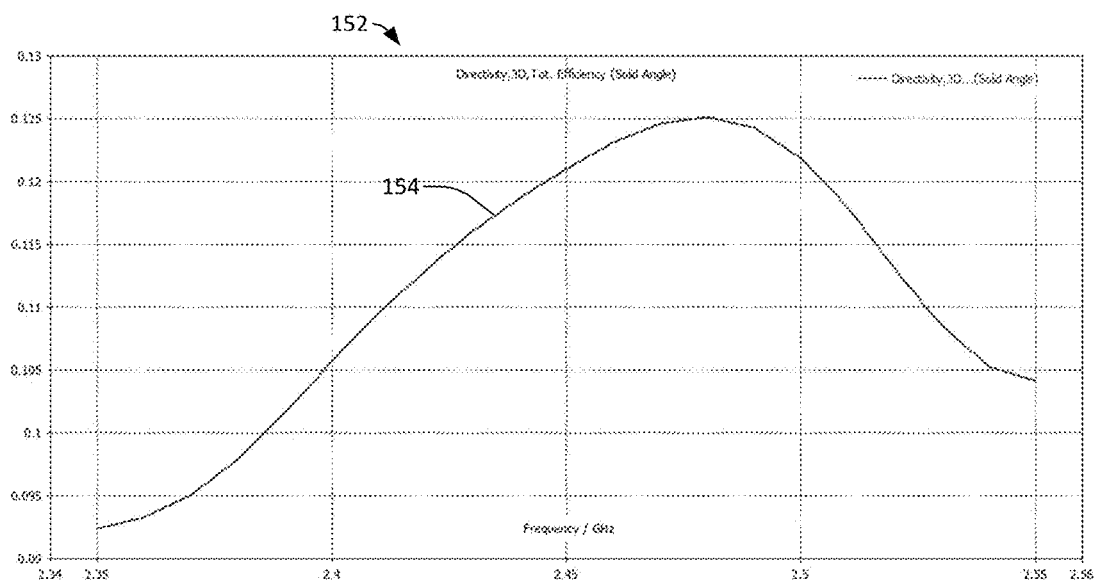
FIG. 20 is a graph of simulated efficiency of an antenna in a device with a single antenna element in a 360 degree mode.

FIG. 20 is a graph 152 of antenna efficiency including a trace 154 showing the antenna efficiency for the antenna 50 in the 360 degree mode when the technique of switching antennas is not used. The efficiency of the antenna 50 is low. The antenna efficiency is close to 11 percent for the antenna 46 in the closed mode of FIG. 19 and for the antenna element 50 in the 360 mode in FIG. 20.

Figure 21:
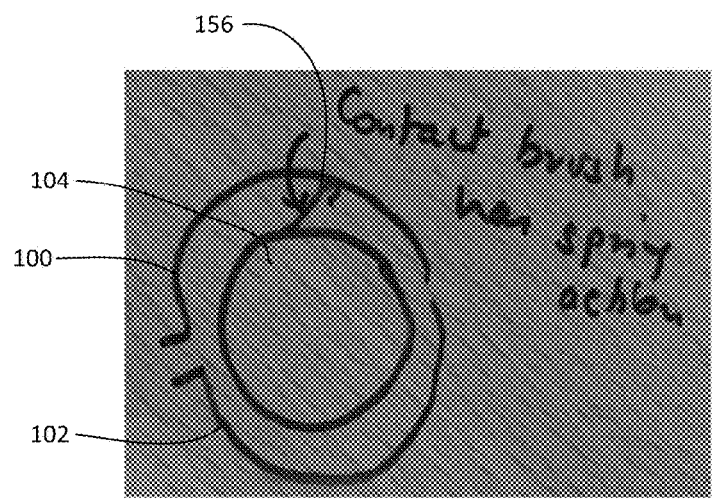
FIG. 21 is a schematic representation of an antenna switch with an alternate contact brush.

With reference to FIG. 21, an alternative contact brush 156 extends from the rotating element 104 into contact with the first contact element 100 or the second contact element 102, depending on the hinge position. The alternative contact brush 156 is provided in place of the contact brush 108. The alternative contact brush 156 may be formed of a spring element such as a spring wire or leaf spring that extends from the rotating element 104 and flexes to remain in contact with the first or second contact elements 100 and 102 during operation of the hinge 44. The spring element of the alternative contact brush 156 may be attached to the rotating element 104 by welding, adhesive, or other attachments or fasteners.

Figure 22:
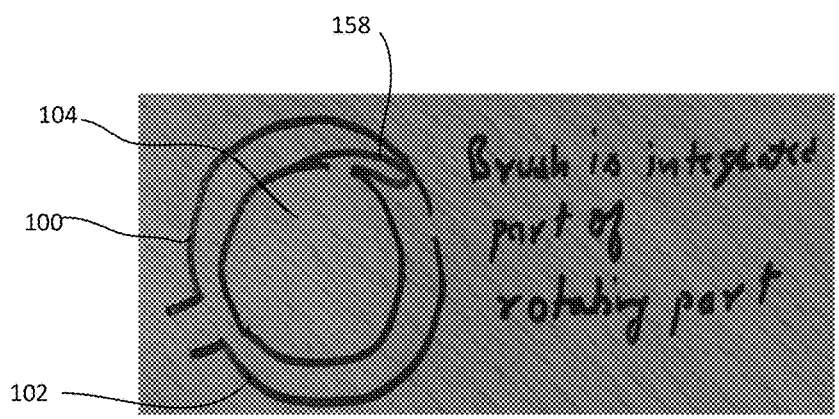
FIG. 22 is a schematic representation of an antenna switch with a further contact brush.

Lastly, FIG. 22 shows a rotating element 104 from which extends an angled contact brush 158. The angled contact brush 158 may be formed as an integrated part of the rotating part 104. The angled contact brush 158 will have some flexibility due to its shape.

A method for operating antennas or for switching between antenna elements or for providing plural antennas depending on hinge position is provided as is apparent from the foregoing.

Thus, there is provided improvements and advantages according to certain aspects. The present aspects provide an improvement over current solutions which have compromised performance for around 50% of the hinge positions (antenna performance is good only for about 180 degrees).

The present improvement may place a mechanism inside the hinge along with two antenna elements placed over hinge. Antenna are placed such as that one of the antenna elements has good performance from 0 degree to 180 degree of display angle and another antenna element has good performance over rest of the display angle.

A method and apparatus is provided for switching between two antenna elements in an electronic device having a hinge. A rotating element within the hinge has a contact brush that extends into contact with a first contact element connected to a first antenna element. Rotation of the hinge moves the contact brush out of contact with the first contact element and into contact with a second contact element, that connects to a second antenna element. The first and second antenna elements are provided on a hinge of an electronic device that may be moved from a closed position to a 360 degree open position or tablet position. The movement of the hinge switches between the two antenna elements to avoid blocking the connected antenna(s) by the body of the electronic device.

EXAMPLES

Example 1 is an antenna for a device having a hinge connecting first and second housing portions, comprising: a first antenna element mounted on the hinge in a position to expose the first antenna element when the first and second housing portions are in a first position; a second antenna element mounted on the hinge in a position to expose the second antenna element when the first and second housing portions are in a second position; and an antenna switch in the hinge and operable to connected the first antenna element to at least one of a transmitting circuit and a receiving circuit of the device at a first hinge position, the antenna switch being operable to connect the second antenna element to at least one of the transmitting circuit and the receiving circuit at a second hinge position, the antenna switch being operable to switch between the first and second antenna elements when the hinge is moved between the first and second hinge positions.

Example 2 is the subject matter of Example 1, wherein the antenna switch includes: a first contact element electrically connected to the first antenna element, a second contact element electrically connected to the second antenna element; and a coupling mounted and configured to selectively couple to either the first contact element or the second contact element depending on a position of the hinge.

Example 3 is the subject matter of Example 2, wherein the first and second contact elements together form an cylindrical interior contact surface, and wherein the coupling is disposed to couple with the interior contact surface.

Example 4 is the subject matter of Example 3, wherein the first and second contact elements define gaps between ends of the respective first and second contact elements.

Example 5 is the subject matter of Example 4, wherein the gaps between the first and second contact elements include non-conductive material shaped to conform to the cylindrical interior contact surface.

Example 6 is the subject matter of Example 3, further comprising: a rotating element disposed within the cylindrical interior contact surface, the coupling rotating into coupling position with the cylindrical interior contact surface.

Example 7 is the subject matter of Example 6, further comprising: a sleeve disposed between the rotating element and the cylindrical interior contact surface.

Example 8 is the subject matter of Example 7, wherein the sleeve defines an opening, and wherein the coupling includes a contact brush extending through the opening.

Example 9 is the subject matter of Example 6, wherein the rotating element includes a cylindrical rotating element disposed coaxially of an axis of rotation of the hinge.

Example 10 is the subject matter of Example 2, wherein the first and second contact elements are fixed in position relative to the first housing portion, and wherein the coupling is fixed in position relative to the second housing portion, the coupling on one hand and the first and second contact elements on another hand rotating relative to one another when the first and second housing portions are hingedly moved relative to one another.

Example 11 is the subject matter of Example 2, further comprising: first and second connection flanges extending from the respective first and second contact elements, the first and second connection flanges being in electrical contact with the respective first and second antenna elements.

Example 12 is the subject matter of Example 2, wherein the coupling includes a contact brush that is spring loaded to urge the contact brush into electrical contact with the first and second contact elements.

Example 13 is the subject matter of Example 2, wherein the coupling includes a contact brush that extends radially from an axis of the hinge.

Example 14 is the subject matter of Example 2, wherein the coupling includes a contact brush that extends at an angle to a radius of the axis of the hinge.

Example 15 is the subject matter of Example 1, wherein the hinge is a two axis hinge, and further comprising: a hinge body extending between the two axes of the two axis hinge; wherein the first and second antenna elements are mounted on opposite sides of the hinge body.

Example 16 is the subject matter of Example 15, wherein the first and second antenna elements are parallel to one another on the hinge body.

Example 17 is a method for switching between first and second element, comprising: rotating first and second housing portions of an electronic device relative to one another, the rotating including rotating the housing portions from a first position to a second position; connecting a transceiver in the electronic device to a first antenna element when the housing portions are in the first position; connecting the transceiver to a second antenna element when the housing portions are in the second position; wherein the first antenna element provides better return loss than the second antenna element in the first position; and wherein the second antenna element provides better return loss than the first antenna element in the second position.

Example 18 is the subject matter of Example 17, further comprising: rotating a rotating element within first and second contact elements when the first and second housing portions are rotated relative to one another; and connecting the rotating element to a respective one of the first and second contact elements depending on whether the first and second housing portions are in the first or second positions.

Example 19 is the subject matter of Example 17, further comprising: exposing the first antenna element for use in the first position; and exposing the second antenna element for use in the second position.

Example 20 is an antenna for a device having a hinge connecting first and second housing portions, the hinge including a dual axle hinge having a hinge body connected between the two hinge axles, comprising: a first antenna element mounted on the hinge body in a position to expose the first antenna element when the first and second housing portions are in a first position; a second antenna element mounted on the hinge body in a position to expose the second antenna element when the first and second housing portions are in a second position; and an antenna switch in the hinge and operable to connected the first antenna element to at least one of a transmitting circuit and a receiving circuit of the device at a first hinge position, the antenna switch being operable to connect the second antenna element to at least one of the transmitting circuit and the receiving circuit at a second hinge position, the antenna switch being operable to switch between the first and second antenna elements when the hinge is moved between the first and second hinge positions, the antenna switch being provided at a first axle of the dual axle hinge, the antenna switch including: a first contact element electrically connected to the first antenna element, a second contact element electrically connected to the second antenna element, the first and second contact elements together form an cylindrical interior contact surface; and a coupling mounted and configured to selectively couple with either the first contact element or the second contact element depending on a position of the hinge, coupling is disposed to contact the interior contact surface, coupling includes a contact brush that is spring loaded to urge the contact brush into electrical contact with the first and second contact elements; a rotating element disposed within the cylindrical interior contact surface, the contact brush extending from the rotating element into contact with the cylindrical interior contact surface; a sleeve disposed between the rotating element and the cylindrical interior contact surface.

Example 21 is an antenna for a device having a hinge connecting first and second housing portions, comprising: a first antenna element mounted on the hinge in a position to expose the first antenna element when the first and second housing portions are in a first position; a second antenna element mounted on the hinge in a position to expose the second antenna element when the first and second housing portions are in a second position; and first contact means for connecting the first antenna element to a transceiver in the first position of the first and second housing portions; and second contact means for connecting the second antenna element to the transceiver in the second position of the first and second housing portions.

Example 22 is the subject matter of Example 21, wherein the first contact means includes a rotating element and a coupling fixed relative to first housing portion and disposed coaxially of a rotational axis of the hinge, the first contact means including a first contact element connected to the first antenna element, the first contact element including a cylindrical portion disposed coaxially of the rotational axis of the hinge; and wherein the second contact means includes the rotating element and the coupling, the second contact means including a second contact element connected to the second antenna element, the second contact element including a cylindrical portion disposed coaxially of the rotational axis of the hinge.

Example 23 is an apparatus comprising means to perform the method as described in any of Examples 17-19.

Example 24 is a computer program product embodied on a computer-readable medium comprising program instructions, when executed, causes a processor to perform the method of any of Examples 17-19.

Example 25 is an apparatus substantially as shown and described.

Example 26 is a method substantially as shown and described.

CONCLUSION

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An antenna for a device having a hinge connecting first and second housing portions, comprising:
   a first antenna element mounted on the hinge in a position to expose the first antenna element when the first and second housing portions are in a first position;
   a second antenna element mounted on the hinge in a position to expose the second antenna element when the first and second housing portions are in a second position; and
   an antenna switch in the hinge and operable to connect the first antenna element to at least one of a transmitting circuit and a receiving circuit of the device at a first hinge position, the antenna switch being operable to connect the second antenna element to at least one of the transmitting circuit and the receiving circuit at a second hinge position, the antenna switch being operable to switch between the first and second antenna elements when the hinge is moved between the first and second hinge positions.

2. An antenna as claimed in claim 1, wherein the antenna switch includes:
   a first contact element electrically connected to the first antenna element,
   a second contact element electrically connected to the second antenna element; and
   a coupling mounted and configured to selectively couple to either the first contact element or the second contact element depending on a position of the hinge.

3. An antenna as claimed in claim 2, wherein the first and second contact elements together form an cylindrical interior contact surface, and wherein the coupling is disposed to couple with the interior contact surface.

4. An antenna as claimed in claim 3, wherein the first and second contact elements define gaps between ends of the respective first and second contact elements.

5. An antenna as claimed in claim 4, wherein the gaps between the first and second contact elements include non-conductive material shaped to conform to the cylindrical interior contact surface.

6. An antenna as claimed in claim 3, further comprising:
   a rotating element disposed within the cylindrical interior contact surface, the coupling rotating into coupling position with the cylindrical interior contact surface.

7. An antenna as claimed in claim 6, further comprising:
   a sleeve disposed between the rotating element and the cylindrical interior contact surface.

8. An antenna as claimed in claim 7, wherein the sleeve defines an opening, and wherein the coupling includes a contact brush extending through the opening.

9. An antenna as claimed in claim 6, wherein the rotating element includes a cylindrical rotating element disposed coaxially of an axis of rotation of the hinge.

10. An antenna as claimed in claim 2, wherein the first and second contact elements are fixed in position relative to the first housing portion, and wherein the coupling is fixed in position relative to the second housing portion, the coupling on one hand and the first and second contact elements on another hand rotating relative to one another when the first and second housing portions are hingedly moved relative to one another.

11. An antenna as claimed in claim 2, further comprising:
first and second connection flanges extending from the respective first and second contact elements, the first and second connection flanges being in electrical contact with the respective first and second antenna elements.

12. An antenna as claimed in claim 2, wherein the coupling includes a contact brush that is spring loaded to urge the contact brush into electrical contact with the first and second contact elements.

13. An antenna as claimed in claim 2, wherein the coupling includes a contact brush that extends radially from an axis of the hinge.

14. An antenna as claimed in claim 2, wherein the coupling includes a contact brush that extends at an angle to a radius of the axis of the hinge.

15. An antenna as claimed in claim 1, wherein the hinge is a two axis hinge, and further comprising:
a hinge body extending between the two axes of the two axis hinge;
wherein the first and second antenna elements are mounted on opposite sides of the hinge body.

16. An antenna as claimed in claim 15, wherein the first and second antenna elements are parallel to one another on the hinge body.

17. An antenna for a device having a hinge connecting first and second housing portions, the hinge including a dual axle hinge having a hinge body connected between the two hinge axles, comprising:
a first antenna element mounted on the hinge body in a position to expose the first antenna element when the first and second housing portions are in a first position;
a second antenna element mounted on the hinge body in a position to expose the second antenna element when the first and second housing portions are in a second position; and
an antenna switch in the hinge and operable to connect the first antenna element to at least one of a transmitting circuit and a receiving circuit of the device at a first hinge position, the antenna switch being operable to connect the second antenna element to at least one of the transmitting circuit and the receiving circuit at a second hinge position, the antenna switch being operable to switch between the first and second antenna elements when the hinge is moved between the first and second hinge positions, the antenna switch being provided at a first axle of the dual axle hinge, the antenna switch including:
a first contact element electrically connected to the first antenna element,
a second contact element electrically connected to the second antenna element, the first and second contact elements together form an cylindrical interior contact surface; and
a coupling mounted and configured to selectively couple with either the first contact element or the second contact element depending on a position of the hinge, coupling is disposed to contact the interior contact surface, coupling includes a contact brush that is spring loaded to urge the contact brush into electrical contact with the first and second contact elements;
a rotating element disposed within the cylindrical interior contact surface, the contact brush extending from the rotating element into contact with the cylindrical interior contact surface;
a sleeve disposed between the rotating element and the cylindrical interior contact surface.

* * * * *